United States Patent [19]

Carpanelli et al.

[11] Patent Number: 4,629,023
[45] Date of Patent: Dec. 16, 1986

[54] MOTOR VEHICLE, OR 'KART' WITH INDEPENDENT SUSPENSION ON ALL FOUR WHEELS, FOR OFF-HIGHWAY USE

[75] Inventors: Carlo Carpanelli; Stefano Serenari, both of Bologna, Italy

[73] Assignee: GO PRO S.r.l., Bologna, Italy

[21] Appl. No.: 770,228

[22] Filed: Aug. 27, 1985

[51] Int. Cl.[4] .................. B62D 63/02; B62D 1/18; B60G 7/04
[52] U.S. Cl. .................. 180/72; 74/473 SW; 74/493; 180/73.4; 180/334; 180/908; 280/696; 280/701; 280/775; 296/205; D12/87
[58] Field of Search .................. 180/72, 73.4, 334, 58, 180/62, 210, 215, 217, 908; 280/701, 696, 666, 775, 96, 112 A, 777, 779; 74/473 SW, 492, 493, 482, 484 R, 512; D12/87; 296/205; 114/144 R; 244/234; 440/58, 62

[56] References Cited

U.S. PATENT DOCUMENTS

| | | | |
|---|---|---|---|
| 3,173,707 | 3/1965 | Peras | 280/701 |
| 3,194,581 | 7/1965 | Brueder | 280/112 A |
| 3,605,932 | 9/1971 | Wilfert | 280/96 |
| 3,712,400 | 1/1973 | Barnes | 180/215 |
| 3,776,353 | 12/1973 | Roth | 180/215 |
| 3,799,283 | 3/1974 | Freber | 180/72 |
| 4,040,375 | 8/1977 | Atkins | 114/144 R |
| 4,541,502 | 9/1985 | Iwai | 180/217 |

FOREIGN PATENT DOCUMENTS 621777 6/1961 Canada .................. 180/62

Primary Examiner—John J. Love
Assistant Examiner—Everett G. Diederiks, Jr.
Attorney, Agent, or Firm—Balogh, Osann, Kramer, Dvorak, Genova & Traub

[57] ABSTRACT

A special 'kart'-type vehicle is disclosed having independent suspension on all four wheels, featuring a rigid central structure which cradles the driver seat, and incorporating interchangeable and adjustable mechanical features designed to give adaptability to different conditions of use, and to the physical stature of a given rider. The special kind of adjustable, accessory-orientated design is such as to recommend the vehicle for dirt track, rough terrain and general off-highway use as well as for running on metalled road surfaces; likewise, a vehicle of the type might be used either for utility purposes or simply for sports or liesure activities.

6 Claims, 3 Drawing Figures

MOTOR VEHICLE, OR 'KART' WITH INDEPENDENT SUSPENSION ON ALL FOUR WHEELS, FOR OFF-HIGHWAY USE

BACKGROUND OF THE INVENTION

The invention relates to a vehicle of the so-called 'kart' type having independent suspension on all four wheels, driven by an internal combustion engine, and intended specifically for off-highway use.

Among the many vehicles currently designed for track, hillside and general rough-terrain sports use which feature propulsion by an internal combustion engine, there are two- and three-wheel bikes having a rigid frame and a front fork-and-handlebar steering arrangement; others are designed substantially along the lines of a conventional automobile, having a rigid chassis to which four wheels are connected, either rigidly, or flexibly by way of a sprung suspension system, and featuring mechanical drive-transmission with a differential.

In all of the vehicles generally referred to, there are drawbacks and shortcomings in the basic structure which give rise to high cost, limited safety, poor road-holding, stiffness, and but little adaptability to the physical stature of different riders; also, there are drawbacks in design which doubtless jeopardize ultimate adaptability of the vehicle to varying conditions of use, which would otherwise be ensured by the interchangeability of specific components.

The object of the disclosure is to set forth a method of embodying a vehicle that will guarantee great stability by virtue of its having four wheels with fully independent suspension and a low center of gravity, and of its featuring a parked adaptability both to different conditions of use and to the physical stature of the individual rider, afforded by lengthwise adjustment of the accelerator and brake pedals, and of the steering frame; such features are provided by a simple and low-cost design which ensures that the vehicle may be used by a wide range of enthusiasts.

SUMMARY OF THE INVENTION

The stated object, together with others, may be realized with a vehicle as disclosed and claimed herein, an essential feature of which is that the steering linkage consists of two rods, each of which hinged at one end to a steering arm integral with the relative wheel hub, and connected at the remaining end to a sleeve slidable horizontally along a rail disposed transversely to the driving position, the movement of the rods being imparted via flexible cables worked by the steering wheel, exploiting an entirely flexible transmission wherein a chain which interconnects the free ends of the cables engages a sprocket keyed to the shaft of the steering wheel. In such an arrangement, rotation of the steering wheel is converted into linear movement and passed on by the ends of the rods to the front wheels with which they connect. The main advantage of such a steering linkage is that the rods, instead of being suspended and moving together with the wheels, are anchored in a well-protected position close to the chassis.

A further advantage of the design is that the links which connect the wheels with the chassis are caused to rotate about an axis which coincides with the axis followed by the sleeve of the steering linkage when sliding along the transverse rail, such that, when maneuvered, the end of each steering rod and the wheel to which it is connected will describe arcs that are concentric and parallel; the result is that movement applied to the front wheels by the steering linkage, and movement originating from the suspension, will have no effect on one another.

The engine of the vehicle is mounted rigidly to the rear end of the chassis, and the same rear end offers mountings for two hinged links providing the suspension for two rear drive wheels. Drive is transmitted from an output shaft which is disposed parallel to the vehicle chassis and journaled thereto by way of rolling bearings; the single rear brake of the vehicle is located on the output shaft, at mid-point. Each end of the output shaft carries a sprocket, and drive is transmitted to the wheels by way of two chains which connect this drive sprocket with a further sprocket keyed to the axle of the relative wheel; suspended weight is thus reduced considerably since the rear wheel hubs carry no brake, and chain drive provides an optimum transmission in any circumstance whatever. Rebound and oscillation in the rear suspension are checked by springs and dampers of a conventional type identical to those utilized for the front suspension.

Adaptability of the controls to the physical stature of the rider is obtained by way of two independent adjustments: a hinged frame for the steering wheel, and a sliding pedal bar. The frame which carries the steering wheel is fashioned from tube bent double and hinged at the ends to the central chassis member; the position of the frame can be adjusted by setting the hinge-pins at the requisite angle and locking with a nut. Gearshift and clutch levers are mounted to the steering frame, the shift linkage incorporating a sleeve disposed coaxial with the steering frame upright. The pedal bar is adjustable lengthwise, and consists of a bar that slides back and forth longitudinally along a lightweight tubular frame attached to the chassis. The lightweight frame is fashioned from two tubular steel members disposed parallel and interconnected at one end by a welded cross-member, the remaining ends being fixed to the chassis; rigidity is ensured by two further tubular members, located beneath and forming brackets such as will resist bending stress. Two clamps, slidable along the two relative parallel tubular members, carry the transverse pedal bar, the ends of which are embodied such as to provide footrests.

BRIEF DESCRIPTION OF THE DRAWINGS

The invention will now be described in detail by way of example, with the aid of the accompanying drawings, in which.

DESCRIPTION OF THE PREFERRED EMBODIMENT

Figure 1:
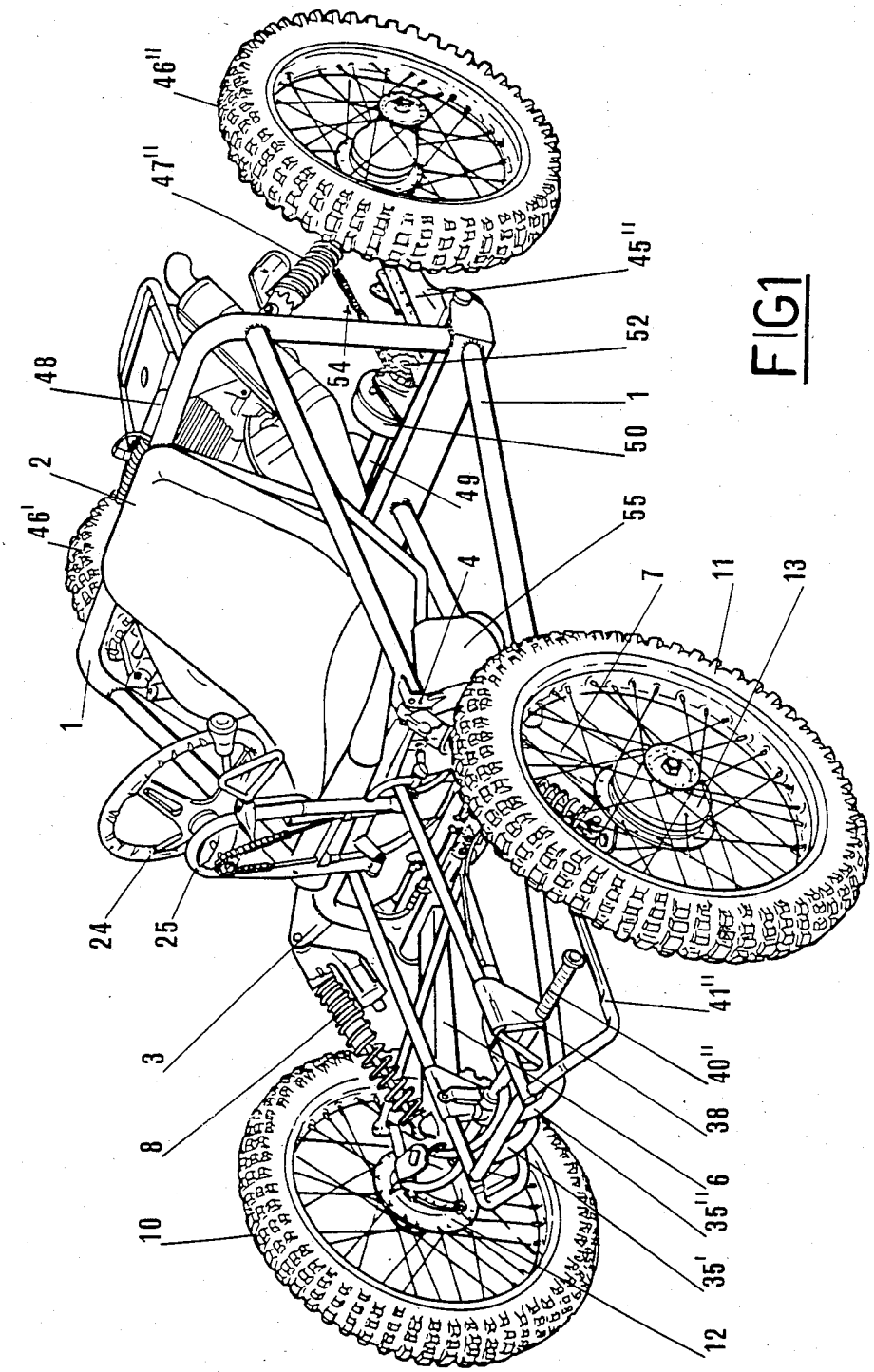
FIG. 1 is a perspective view of the vehicle in its entirety.

The kart-type vehicle disclosed is provided with a chassis 1 that also functions as a cockpit, into which a seat 2 is mounted in fixed position.

3 and 4 denote mounting points at the front end for springs 8 and dampers 9 forming part of the front suspension, which consists of a pair of hinged links 6 and 7 to which respective wheels 10 and 11 and brakes 12 and 13 are attached.

Figure 2:
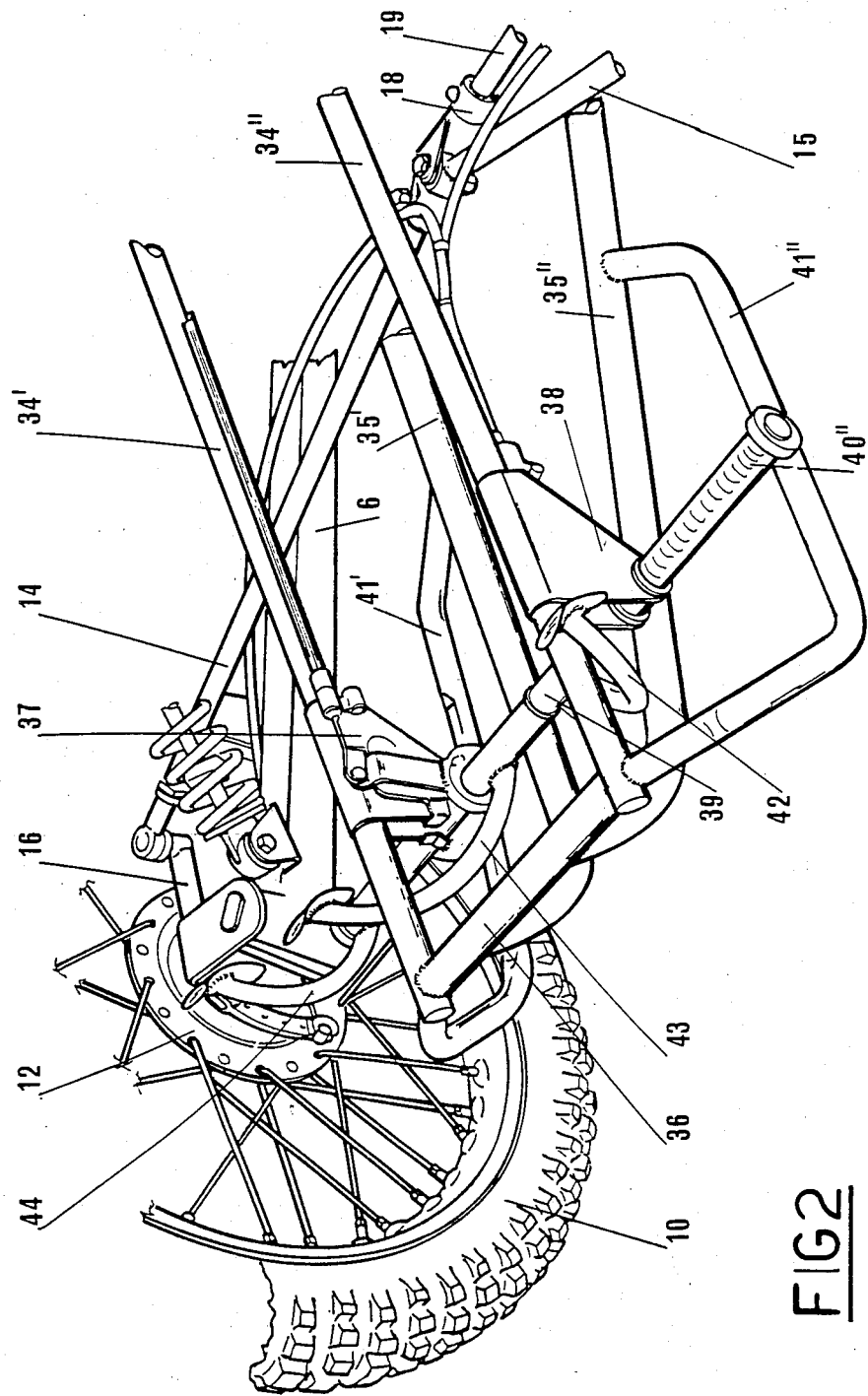
FIG. 2 is a perspective view of the front end of the vehicle, illustrating the frame which carries the adjustable pedal bar.
Figure 3:
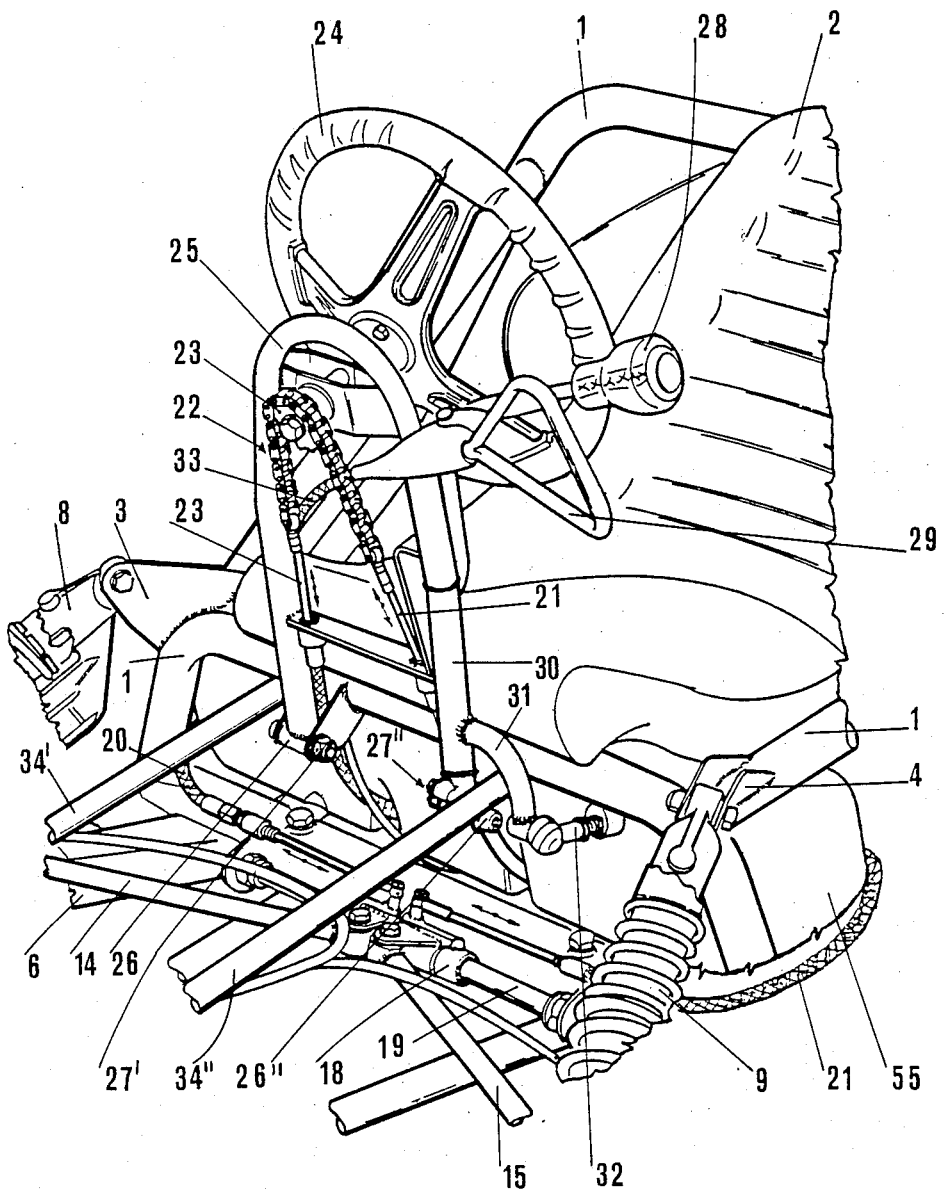
FIG. 3 is a perspective view showing the steering frame and the flexible transmission which operates the steering linkage.

The steering linkage comprises rods 14 and 15 connected to the wheels 10 and 11 by two respective steering arms 16 (FIG. 2) and 17 which are not visible in the drawing. The inner end of each rod 14 and 15 is hinged to a sleeve 18 which slides axially back and forth along a rail 19 disposed transversely to and integral with the chassis. The steering linkage is operated by way of flexible cables 20 and 21 (FIG. 3) the bottom ends of which connect with the sleeve 18 at points 20' and 21', and the top ends of which connect with either end of a stretch of chain 22 that engages a sprocket 23 keyed to the shaft of the steering wheel 24.

The steering wheel 24 is fitted to a frame 25 the bottom ends of which connect with the chassis by way of hinges 26' and 26"; adjustment of the frame is made by tightening nuts 27' and 27" at the ends of the relative hinge-pins. The hinged frame 25 also carries a gearshift lever 28 and clutch control 29. The gearshift lever 28 transmits through a sleeve 30 which is coaxial with and rotatable about one of the uprights of the frame 25, thence through further linkage components 31 and 32, whereas the clutch control 29 operates a flexible cable 33.

34' and 34" denote the tubular members of a lightweight frame welded integral with the chassis (FIG. 2); the two members are disposed parallel and are interconnected at their front ends by a crossmember 36; the rigidity to withstand bending stress is ensured by further tubular members 35' and 35", and by outer rails 41' and 41" which serve as footguards. Two slidable clamps 37 and 38 fitted to the respective tubular members 34' and 34", carry a bar 39 to which the front brake pedal 42, rear brake pedal 43, and accelerator pedal 44, are all hinged; movement of the pedals relative to the bar 39 is produced by way of coaxial sleeves, whilst control is by way of flexible cables.

At the rear end of the vehicle, hinged links 45' and 45" attached to the chassis 1 provide the supports for respective rear wheels 46' and 46"; rebound-and-oscillation of the two links is checked by spring and damper assemblies 47' and 47".

Drive is transmitted from the engine 48 to the rear wheels 46' and 46" from an output shaft 49 to which the rear brake 50 is mounted. Two sprockets 51 and 52 are keyed to the shaft 49, one at either end, and the transmission link to the two wheels takes the form of two chains 53 and 54 which connect the two wheels 46' and 46" with their respective drive sprocket 51 and 52. The physical connection between chain and drive wheel takes the form of a further sprocket which, though not visible in the drawings, is keyed to the hub of each wheel 46' and 46". Parts denoted 45', 47', 51 and 53 are likewise obscured from view in FIG. 1 but are identical in all respects to those denoted 45", 47", 52 and 54.

The vehicle thus described will be seen to embody engineering features of great simplicity and economy -viz, the rear wheel drive incorporates just one output shaft 49 located in a fixed position and supported by the chassis, whilst rebound and oscillation of the rear wheels 46' and 46" is compensated by the drive chains 53 and 54. Similarly, control of the steered wheels 10 and 11 is obtained by way of a flexible control 20 and 21 which operates a linkage comprising the sliding sleeve 18 and rail 19, and the rods 14 and 15 which in turn are attached to the sleeve.

The fuel tank 55, located beneath the seat 2, remains within the confines of the chassis-cockpit structure 1 in a well-protected position.

A person skilled in the art will recognize that the invention as described and illustrated may vary in design and/or be integrated by accessories without any departure from the basic concept. For instance, the front suspension might incorporate separate rather than coaxial springs and dampers; brakes might be disc rather than drum; the chassis might be box-constructed; the pedal adjustment might utilize telescope struts; the wheels might be of any given type and size; the rear drive transmission could incorporate universal joints; propulsion might be multiple; the steering might utilize fluid power rather than flexible cables, and so on.

What is claimed:

1. A motor vehicle intended for off-highway use comprising:
    a rigid chassis and cockpit structure supporting a driver seat;
    a pair of front steerable wheels and a pair of rear wheels, each wheel having a brake associated therewith;
    a pair of fully independent front and rear suspension links, each suspension link being pivotally connected to said chassis at one end for vertical movement with respect to said chassis and having a respective wheel rotatably mounted at the other end, said suspension links being overhung forward in the case of the two front steerable wheels and rearward in the case of the two rear wheels;
    an engine mounted on a rear portion of said chassis and having and output shaft disposed transversely of said chassis;
    a pair of independent transmission links connecting the output shaft to each of said rear wheels;
    an upright, arched frame located centrally and forward of said driver seat to which a steering means, including a steering wheel, a gearshift lever, and a clutch lever are mounted;
    means connecting said front steerable wheels to said steering wheel;
    a transverse bar, mounted to a forward portion of said chassis, having a front brake pedal, a rear brake pedal, and an accelerator pedal rotatably mounted thereon;
    and flexible cable means operatively connecting said front brake pedal to said brakes associated with said front steerable wheels and said rear brake pedal to said brakes associated with said rear wheels.

2. A motor vehicle as recited in claim 1 wherein said driver seat is fixed with respect to said chassis, said chassis including two parallel longitudinal members, and said transverse bar is slidably mounted on said longitudinal members thereby permitting longitudinal adjustment of said brake and accelerator pedals to accommodate drivers of various sizes.

3. A motor vehicle as recited in claim 1 wherein the upright, arched frame is pivotally connected at its bottom ends to the chassis by means of transversely-disposed pins, the connection allowing adjustability of the steering frame in the longitudinal direction of the vehicle.

4. A motor vehicle as recited in claim 1 wherein the means connecting said front steerable wheels and said steering wheel comprises:

a pair of steering rods connected to said front steerable wheels by a pair of steering arms, said steering rods being hinged to a sleeve slidable along a transverse rail fixed to said chassis and being subject to the oscillations in concert with the front suspension links;

a shaft rigidly connected to said steering wheel;

a sprocket keyed to rotate with said shaft;

and two flexible cables, one end of each cable being connected to a respective steering rod, the remaining ends being interconnected by a chain which is entrained about said sprocket, whereby rotation of said steering wheel functions to steer said front steerable wheels.

5. A motor vehicle as recited in claim 1 wherein said output shaft extends laterally out from said engine in both directions and has a drive sprocket mounted on each end thereof;

a further driven sprocket keyed to a hub of each of said rear wheels;

and wherein said independent transmission links comprise two drive chains, each chain being entrained about a respective drive and driven sprocket to thereby transmit drive to said rear wheels.

6. A motor vehicle as recited in claim 1 wherein the gearshift lever operates a linkage comprising a sleeve which is coaxial with and rotatable about an upright leg portion of said upright arched frame.

* * * * *